No. 688,775. Patented Dec. 10, 1901.
F. D. FRY.
POLISHING WHEEL.
(Application filed July 12, 1899.)
(No Model.)
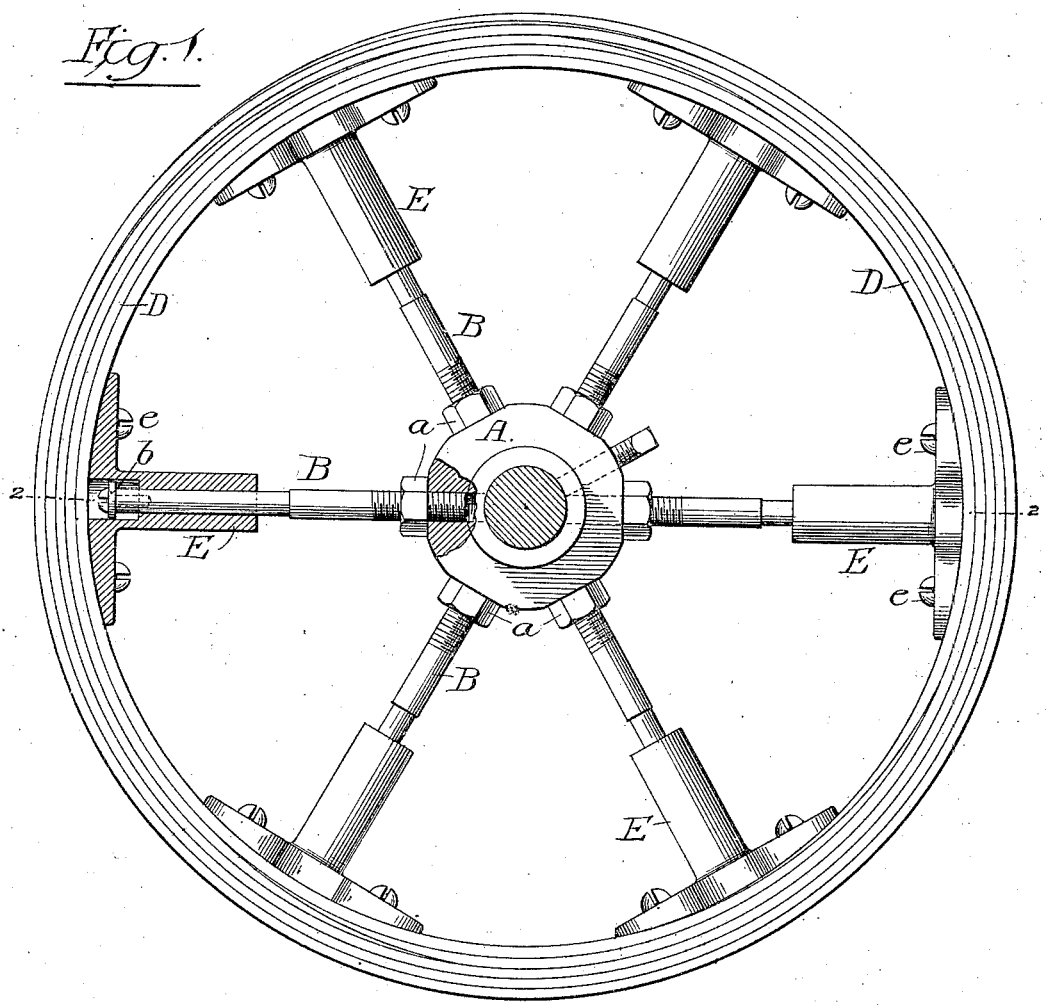
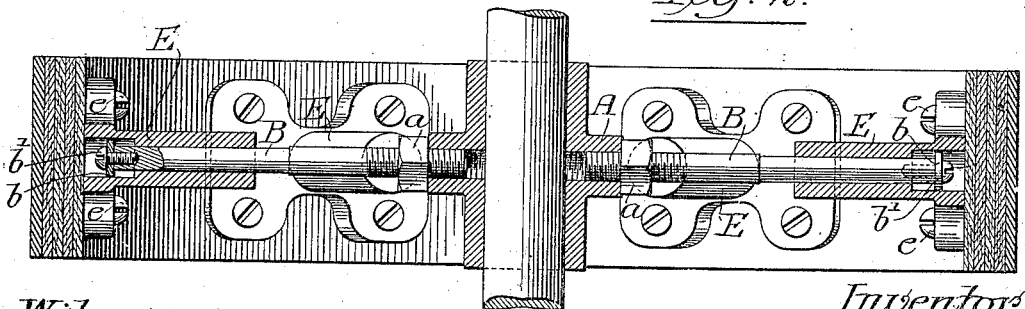

UNITED STATES PATENT OFFICE.

FREDERICK D. FRY, OF NEWARK, NEW JERSEY, ASSIGNOR OF ONE-HALF TO THE FERRO-CARBON CASTINGS COMPANY, OF PHILADELPHIA, PENNSYLVANIA, A CORPORATION OF PENNSYLVANIA.

POLISHING-WHEEL.

SPECIFICATION forming part of Letters Patent No. 688,775, dated December 10, 1901.

Application filed July 12, 1899. Serial No. 723,596. (No model.)

*To all whom it may concern:*

Be it known that I, FREDERICK D. FRY, a citizen of the United States, and a resident of Newark, New Jersey, have invented certain Improvements in Polishing-Wheels, of which the following is a specification.

The object of my invention is to construct a cushioned polishing-wheel in such a manner that it will yield under pressure and can be adjusted for the purpose set forth. The wheel can be cheaply manufactured and is efficient and economical in operation, forming what may be termed a "cushioned" emery-wheel. This object I attain in the following manner, reference being had to the accompanying drawings, in which—

Figure 1 is a side view of my improved emery-wheel. Fig. 2 is a section on the line 2 2, Fig. 1.

A is the hub of the wheel, to which are adjustably secured the spokes B. In the present instance these spokes are screw-threaded and adapted to screw-threaded openings in the hub and are held in their adjusted position by means of jam-nuts $a$.

D is the rim of the wheel, made up of a series of layers of leather in the present instance, so as to give sufficient stiffness to the rim. On the periphery of this rim are secured particles of emery in the ordinary manner. Secured to the rim are a series of sockets E, adapted to the spokes B. Secured to the end of the spokes in the present instance are heads $b$ in the form of washers attached to the ends of the spokes by screws $b'$. The sockets have a limited movement on the spokes, depending altogether upon the elasticity of the rim, the amount of pressure applied, and the amount of adjustment given to the spokes.

The sockets E are secured to the leather rim in the present instance by screws $e$, and the base of each socket is formed, as shown, so that there will be a space between the points of attachment to allow the rim to yield to a certain extent.

By my improvement I make a very substantial wheel, the rim of which will yield under pressure and in which the emery will be subjected to an even wear, and in the event of a soft spot occurring in the leather of the rim, which is frequently the case in this class of wheels, I can readily draw that portion of the rim toward the center, so that it will not be thrown out beyond the line of the wheel when rotated, as it will be understood that where a soft spot occurs that portion of the wheel is liable to be thrown out beyond the line of the wheel, and consequently the emery will be worn away at that point and the wheel will have to be recoated. Furthermore, I utilize the full width of the wheel as a cushion and dispense entirely with metallic side plates.

I claim as my invention—

1. In a polishing-wheel, the combination of a hub and a rim, tubular pieces attached to and projecting inwardly from said rim, other pieces serving as spokes fixed in the hub and entering the tubular pieces on the rim, the said tubular pieces sliding upon the same, and means on each spoke for adjusting the curvature of the rim, substantially as described.

2. In a polishing-wheel, the combination of a hub and a rim, spokes fixed in the hub and having heads on their ends, pieces fixed to the rim and projecting inwardly therefrom, said pieces being tubular, part of the caliber being constructed to receive the spokes and part to receive the heads thereof, substantially as described.

3. The combination in a polishing-wheel, of a hub having screw-threaded openings, screw-threaded spokes adapted to the threaded openings, jam-nuts adapted to the spokes, a rim made up of a number of thicknesses of leather, a series of sockets secured to the rim and having openings in which the spokes are mounted, a head on each spoke adapted to travel in a recess in the socket, substantially as described.

4. The combination in a polishing-wheel, of a hub, spokes projecting therefrom, means for radially adjusting said spokes, and means for rigidly holding them after they have been adjusted, a rim to the wheel carrying sockets constructed to receive the ends of the spokes and in which the spokes are free to move, and means on the spokes for engaging the sockets and thereby holding any desired portion of the rim in a position other than that normally assumed, substantially as described.

In testimony whereof I have signed my name to this specification in the presence of two subscribing witnesses.

FREDERICK D. FRY.

Witnesses:
MURRAY C. BOYER,
JOS. H. KLEIN.